June 1, 1954  R. C. TRESEDER  2,679,908
PROPELLER CONTROL
Filed Feb. 5, 1949
4 Sheets-Sheet 1

INVENTOR.
ROBERT C. TRESEDER
BY
Spencer, Hardman & Fehr
HIS ATTORNEYS

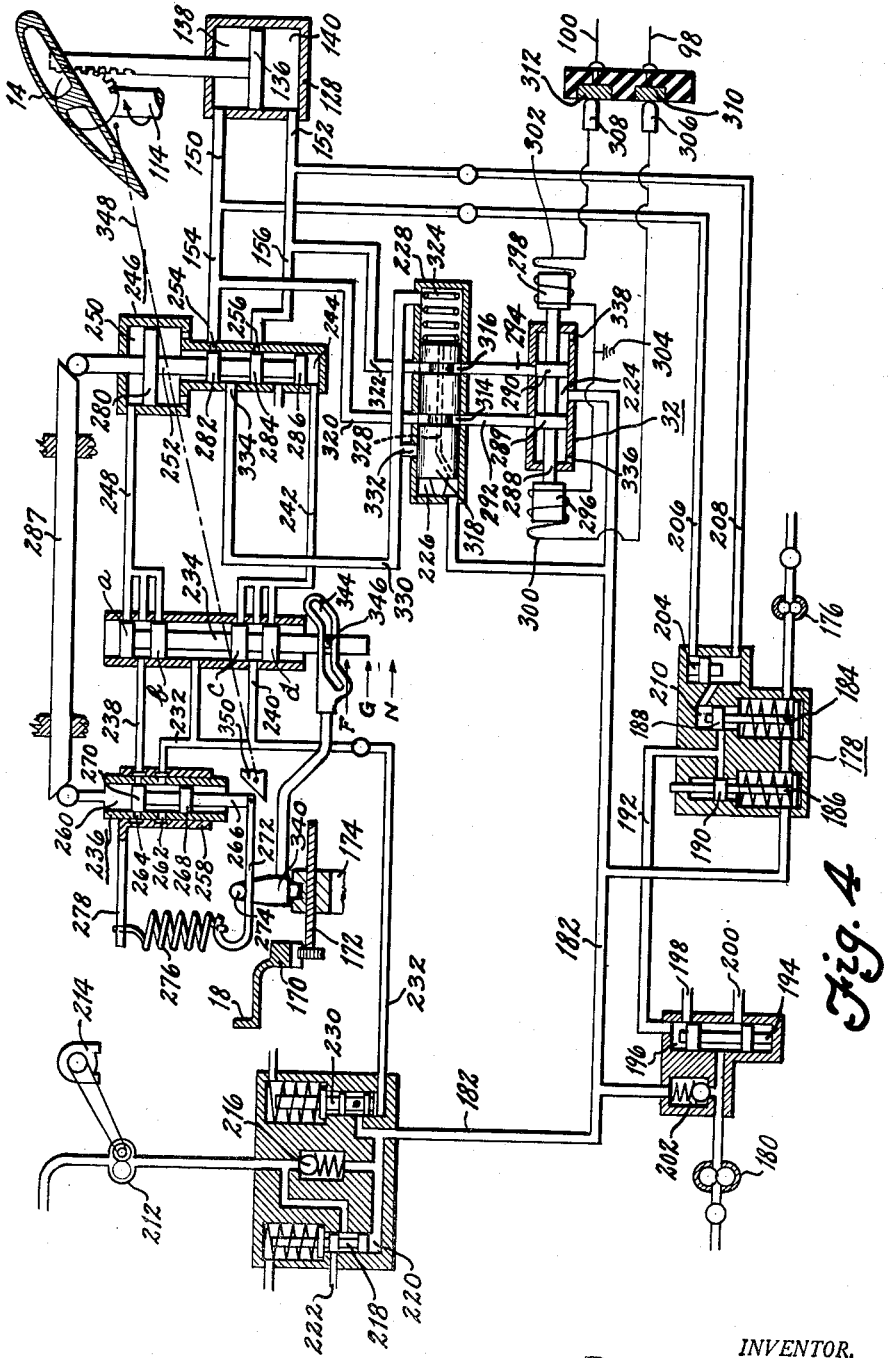

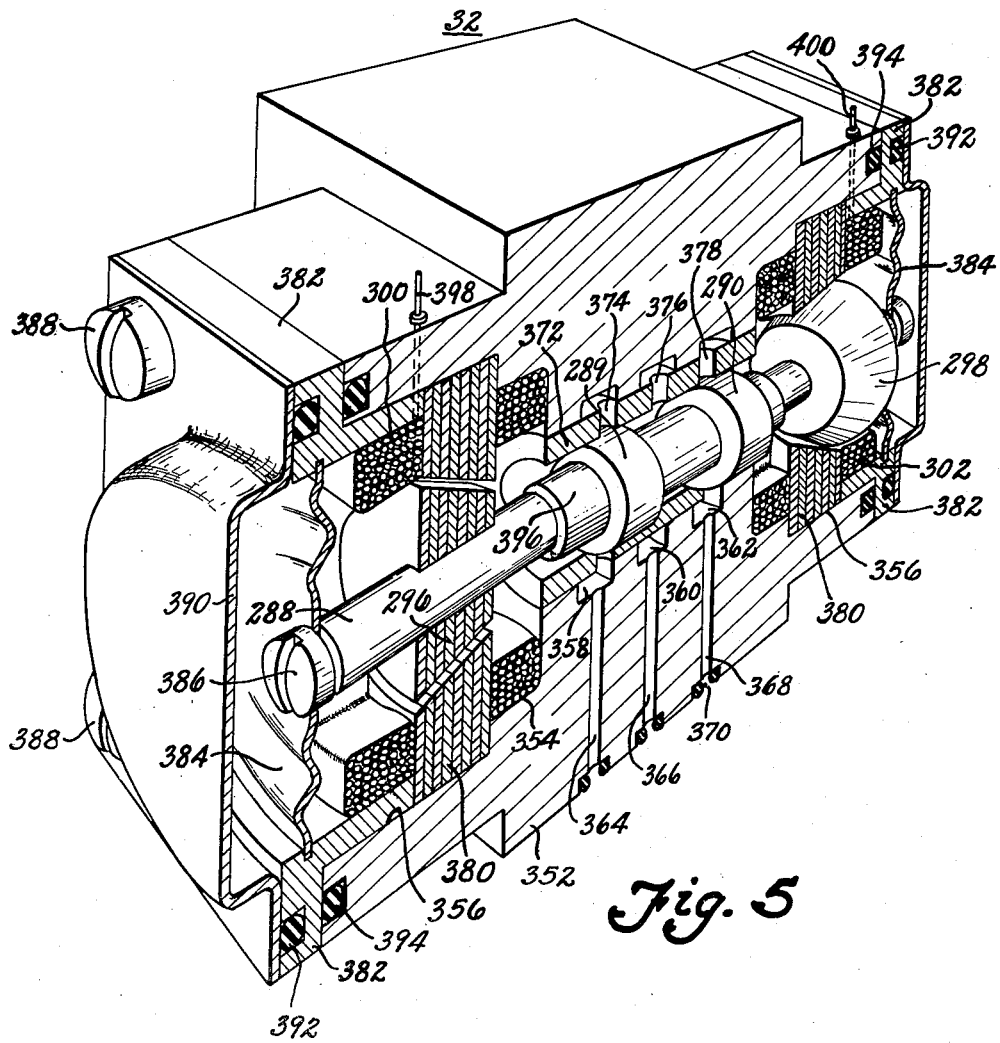

Patented June 1, 1954

2,679,908

UNITED STATES PATENT OFFICE 2,679,908

PROPELLER CONTROL

Robert C. Treseder, Dayton, Ohio, assignor to General Motors Corporation, Detroit, Mich., a corporation of Delaware Application February 5, 1949, Serial No. 74,794

12 Claims. (Cl. 170—135.29)

This invention relates to the control of aircraft propellers, and has for a main object to effect the synchronous operation of a plurality of engine propeller combinations at a selected reference speed.

One object of the invention is to control each propeller component to approximately the reference speed, and then govern the speed to agreement with the reference speed.

Another object of the invention is to provide control means for engine-propeller combinations that will effectively control the combination throughout the entire range of propeller operation, and rest conditions.

Another object of the invention is to provide adequate manual control superimposable at any time upon the automatic control whether the propeller be active or inactive.

A further object of the invention is to provide control means for an engine-propeller combination that incorporate two sections which combine to effect complete control over an extensive speed response curve and maintain propeller operation at a selected reference speed or other selected condition of propeller operation.

Yet another object of the invention is to provide a system of control for an engine-propeller combination capable of operating in selected bands of a pitch range from negative to feathering with automatic shift within one of the bands by a combined course and fine pitch control cooperating to effect control closely agreeing with a selected operating condition, and means for interrupting the combined action of the coarse and fine pitch control whenever the propeller is operating in other than that band.

Still another object of the invention is to provide for complete control of an engine propeller combination by providing a self contained hydraulic speed sensitive control for the propeller component that will adjust the propeller operation to approximately the selected condition, and supplement that by an additional control outside of the propeller component for effecting adjustment of finer increments to agree with a selected reference condition.

Further objects and advantages of the present invention will be apparent from the following description, reference being had to the accompanying drawings wherein a preferred embodiment of the present invention is clearly shown.

In the drawings:

Fig. 4 is a fluid circuit diagram forming a schematic view of the hydraulic system for control of the propeller.

Fig. 5 is a sectional view showing the details of one of the control valves used in the system shown on Figs. 1, 3 and 4.

Propeller controls, particularly those designed for synchronous operation of engine-propeller combinations with respect to a reference speed, may be divided into two general groups, or types, one of which groups obtain control by the adjustment of the equilibrium speed of a primary propeller governor, while the other group obtains control by changing the propeller pitch directly and by finer increments of change. Each type of control has some advantages. Those of the first mentioned type can generally be applied to an existing propeller control without much change in the control mechanism and are nearly always subject to override by pilot operated manual controls in case of emergency. However close control requires precision manufacturing to small tolerances. Those of the second mentioned type are less expensive to build with a higher degree of precision though of smaller range of control, and if failure of control occurs the propeller is left in fixed pitch as compared with drift to an undesirable pitch setting.

Figures 1, 2A, 2B:
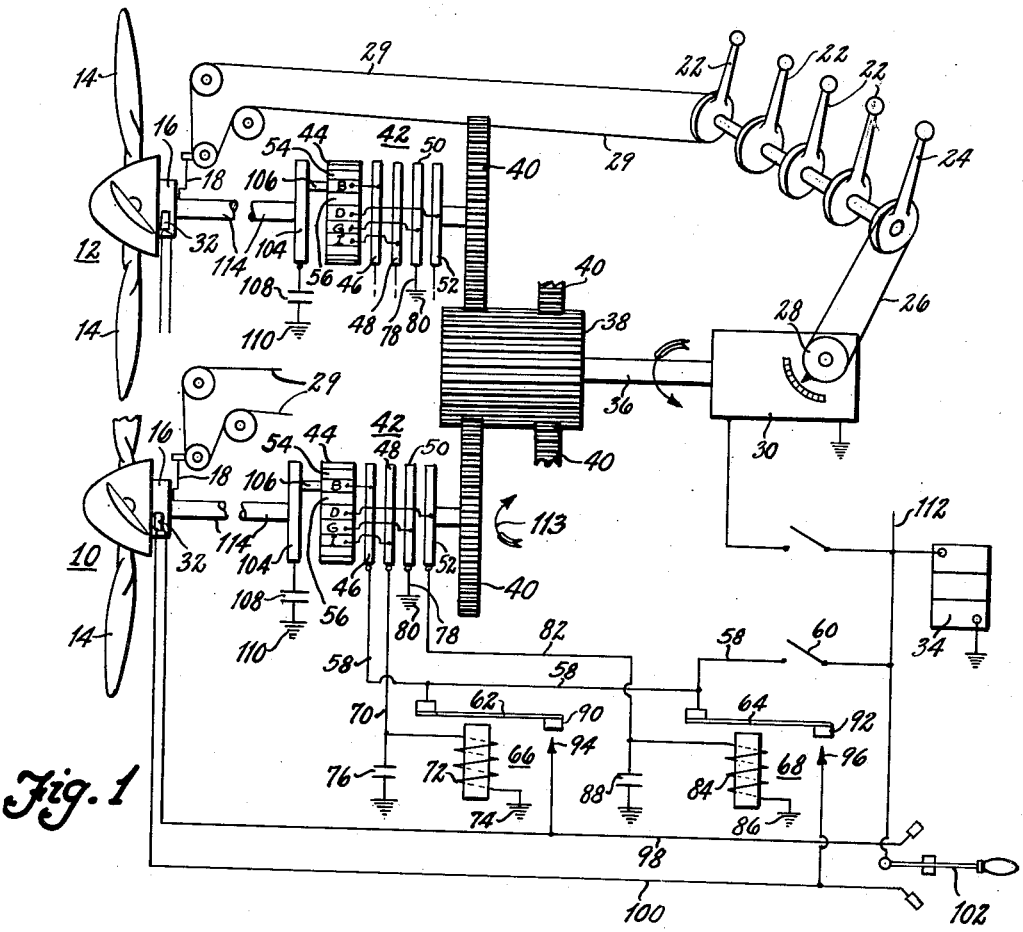
Fig. 1 is a schematic diagram of a multiplacement engine-propeller combination with a part of the control mechanism for effecting operation in accordance with a selected set of conditions.
Fig. 2A and Fig. 2B are graphs depicting the speed response curve for the different sections of the control mechanism.
Figure 3:
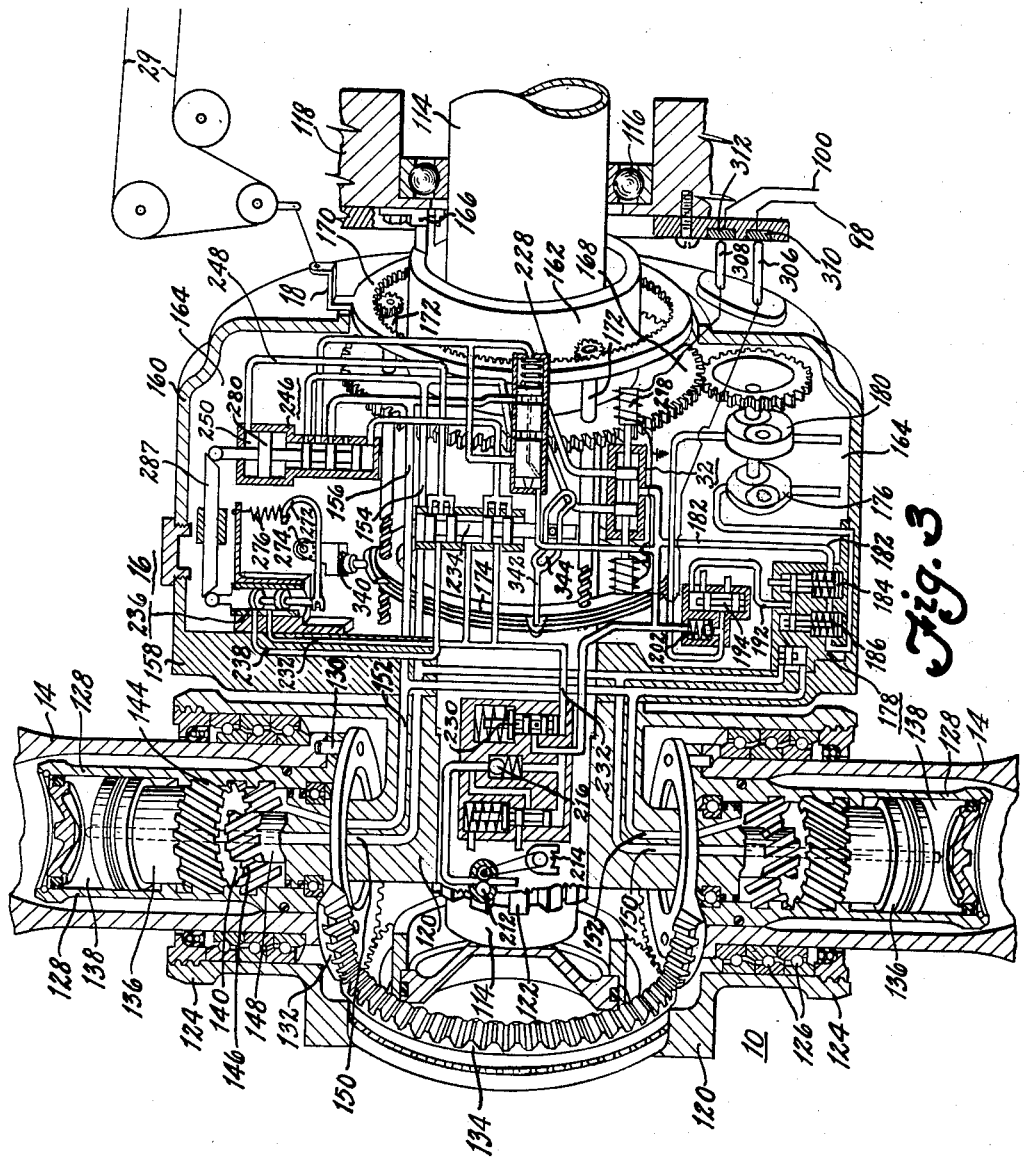
Fig. 3 is a structurally schematic view of a propeller component in section and the adaption of a hydraulic control mechanism for effecting full control of the rotating propeller.

The foregoing objects are accomplished with all the advantages of the two types of controls by providing a hydraulic control system such as shown in Figs. 3 and 4, operative incident to propeller rotation for developing a source of fluid pressure to be distributed to blade pitch changing motors by a distributor valve, controlled by a speed sensitive device and having a speed response curve somewhat of the character shown in Fig. 2B, where there is a zero response region ineffective upon the speed sensitive device controlling the distributor valve. Positive overlap of the piston lands in relation to the control ports leading to the blade shifting motor will provide what may be termed a trimming control, since that will suffice to approximate the control shift asked for by a selected reference speed or other operating condition, and leaves the propeller mechanism as a controllable pitch propeller over a zero response portion of the curve, which is served directly by a solenoid actuated valve (Figs. 3, 4 and 5) connected to the pitch changing motor and under the control of a speed sensitive controller outside of the propeller as shown in Fig. 1, that compares the current speed of the engine-propeller combination with a reference speed source, whether it be produced by a master engine-propeller combination or by a master speed source, and returns an impulse or proportionated control function to correct an erring combination in a governing sense. The governing control responding to the smaller speed changes of the graph shown in Fig. 2A effects a fine adjustment of the pitch change motor, and supplements the trimming control responding to greater offspeeds of the graph shown in Fig. 2B which together cover the entire range of propeller controlled adjustment. When the offspeed of the combination is so great as to manifest in operation of the trimming control, the governing control is isolated by means of a blocking valve for the solenoid actuated valve. That may happen whenever the propeller is operated in feathering or negative pitch. In other words, to prevent simultaneous operation of both valves, (the distributor valve and the solenoid actuated valve), the solenoid actuated valve is made subservient to the distributor valve. That is accomplished by a pressure-differential sensitive valve and the pitch changing motor as shown in Fig. 4.

Referring particularly to the drawings, and first with respect to Fig. 1, the reference numerals 10 and 12 indicate each a variable pitch propeller component of a multiplacement engine-propeller combination for aircraft, in which each propeller component has a plurality of pitch shiftable blades 14 controlled by a hydraulic regulator 16. The regulator is always under control of a pilot actuated lever 18 actuatable through manual controls comprising cables 20 and levers 22 and 24, which make it possible to select the particular band of pitch range within which the propeller component is to operate, and the particular speed setting at which the hydraulic control is to regulate. The showing in Fig. 1 comprehends an installation of four engine-propeller combinations, but more or less may be used, and each of which would be manually controlled by individual levers 22 and cables 20 and as a group by the master lever 24. The control of each hydraulic regulator 16 takes into account as will presently appear with respect to Figs. 3 and 4, adjustment to operate in either feathering pitch, negative pitch and shift from one band to the other, which selective speed location within the governed positive pitch band at which the propeller is to operate.

While the propeller component is operating within the governed positive pitch band the regulator 16 is also under control of a master or reference speed source 30 selectively adjustable by the lever 24 through cable 26 and pulley 28, to operate a solenoid actuated valve 32 embodied in the regulator 16 that rotates with the propeller component. This speed control is superimposed upon the control effected by the hydraulic regulator 16 and may take the form of an engine synchronizer mechanism as shown in Fig. 1 and as claimed in the Patent 2,501,228, granted March 21, 1950, in the name of James W. Light. Here the reference speed source 30 is shown as a unit driven at a constant speed selected by a pulley or knob 28 by adjustment of the lever 24, the unit being driven by the battery 34 so that the output shaft 36 rotates a driver 38 for operating a plurality of gears 40 at the same speed, the speed selected by the knob 28. There is a gear 40 for each of the engine-propeller combinations to be controlled, and each gear 40 drives a rotatable element 42 consisting of a plurality of commutator bars about a ring 44 and slip rings 46, 48, 50 and 52. Each ring of bars comprises one or more groups of six separate bars designated as a blank 54, B, blank 56, D, G, and I, those designated by letters being connected each to the slip rings, such that all B bars are connected to slip ring 46, bar D to ring 52, bar G to ring 50 and bar I to ring 48. Each slip ring engages a brush or wiper from which extend electric leads to the extent that connecting with ring 46 is a lead 58 connected with the battery 34 through a switch 60 and having branches connecting with armatures 62 and 64 of relays 66 and 68. Ring 48 connects by lead 70 with a winding 72 of relay 66 to ground at 74 and has a by-pass connection through a condenser 76. Ring 50 connects by lead 78 to ground at 80, and ring 52 connects by lead 82 with winding 84 of relay 68 to ground at 86, there being a similar by-pass through a condenser 88. The armatures 62, 64 of the relays support movable contacts 90, 92 respectively normally disengaging fixed contacts 94, 96 connected respectively with electric impulse lines 98, 100 leading to the solenoid actuated valve 32. Either one of the lines 98, 100 may be energized by closing of the contacts of either relay, or by the manipulation of a selector switch 102 connected with the battery 34.

Associated with each of the commutator rings 44 there is a rotatable element 104 driven by or at a speed in proportion to one of the propeller components, and each element 104 is provided with a movable contact 106 adapted to engage the ring of commutator bars and wipe over them as there is experienced differentials of rotation between the associated propeller component and commutator group which is always related to the reference speed source. A condenser 108 grounded at 110 is constantly in circuit with the rotatable element 104 and is thus brought into successive communication with the bars of the ring 44 whenever there is relative rotation between the elements 104 and 44. That mechanism has been shown in full, connected to the propeller component 10, and it is understood that the same is to be duplicated for each component to be controlled by the reference speed source 30, since electrical connections can be appropriately made through the discontinued branch 112 leading to the battery 34. It should be apparent from the foregoing that the engine synchronizer device of Fig. 1 compares the current speed of each propeller component with the reference speed source and translates any off-speed of either propeller component into an electric impulse in one or the other of the lines 98, 100 leading to the solenoid actuated valve 32 for effecting a corresponding correction of an erring component.

If there is no off-speed, that is, if the propeller components are operating at the reference speed determined by the unit 30 there will be no relative rotation between the commutator group 44 and the element 104, and there will be no operation of either relay 66 or 68. On the other hand, if there is a differential of rotation between the two elements, the movable contact 106 will wipe over the commutator bars in succession in one direction or the other. As an example, assume that the rotation of the elements 40, 44 and 104 are rotating in the direction of the arrow 113, and that the element 104 is rotating slower than the group of commutator bars, though in the same direction and giving an underspeed for the component 10. Under those conditions, the movable contact 106 would successively engage the bars in the order B, 56, D, G, and I. That successive engagement first charges the condenser 108 from the battery through the switch 60, lead 58, slip ring 46, bar B, contact 106 and element 104, which charge is held until the contact 106 engages bar D, whereupon the condenser 108 discharges through bar D, slip ring 52, lead 62 and winding 84 of relay 68. Energization of the relay winding 84 actuates the armature 64 to close contact with 96 and connect the battery 34 with impulse line 100 giving a decrease pitch signal to the solenoid actuated valve 32 of the propeller component 10. In like manner an impulse for correction of overspeed can be traced through the relay 66 when the relative rotation of the elements 44, 104 is in the reverse direction. Continued rotation in either direction might cause the movable contact 106 to engage a bar of the opposite corrective sense, and thus cause an improper control of the solenoid valve, were it not for the interposing of a condenser grounding bar G between the decrease pitch bar D and the increase pitch bar I. By that interposing, in the foregoing example of operation, should the movable contact 106 contact the bars G and I after having passed over the pitch decrease bar D, the condenser 108 would be completely discharged of any residual charge before the contact 106 engages the pitch increase bar I, which prevents any opposing adjustment by the solenoid actuated valve 32. The synchronizer device shown in Fig. 1 is designed to respond to speed differences in the order of zero to about 30 R. P. M., and somewhat as indicated by the graph of Fig. 2A. For greater offspeeds, such as depicted by the graph of Fig. 2B, dependence is had upon the control effected by the hydraulic regulator 16, which will be more clearly understood after the description of Fig. 3 and Fig. 4. The specific control effected by the energization of the solenoid actuated valve 32 can better be understood after a description of the hydraulic regulator and the control effected by it.

Fig. 3 schematically illustrates a sectional view of a variable pitch propeller of the type disclosed in the patents to Blanchard et al. 2,307,101 and 2,307,102, granted January 5, 1943, on which is superimposed the hydraulic control circuit of this disclosure. An engine driven propeller shaft 114 is rotatably supported by a bearing 116 mounted in the craft structure or gear casing 118 and extends therefrom to support and drive a propeller hub 120, through the splined provisions 122. All of the propeller components are alike, and their hubs 120 each provide the necessary number of sockets 124 to journal on stack bearings 126 each a blade 13 of the propeller component. Each blade 14 is adjustable about its pitch change axis by a double acting torque unit comprising a cylinder 128 secured to the blade root by dowels 130 also securing for rotation with the blade a blade gear 132 each meshing with a master gear 134. A piston 136 divides the cylinder 128 into a pair of opposed chambers 138, and 140, and the piston has a helically splined union at 144 with the inside of the cylinder 128, and at 146 with the outside of a spindle 148 extending from the hub 120. Communicating with the piston chamber 138, 140 there are passages 150, 152 respectively that traverse the spindles 148 and hub 120 and join like passages to connect to the control apparatus within the regulator 16, by means of control passages 154, 156 respectively.

The regulator 16 comprises an annular plate 158 mounted on and driven by the hub 120 for support of the control apparatus shown in Fig. 4, and has attached thereto a cover member 160 cooperating with an adapter assembly 162 to provide a reservoir 164 enclosing the control apparatus and containing the fluid medium by which the control apparatus functions. The adapter assembly 162 is fixed against rotation with the regulator 16 by means of restraining means 166 provided by the gear case 118, and extends within the axis of the cover 160 to provide a gear flange 168 adapted to drive a fluid pump located within the reservoir 164 upon rotation of the propeller component. The adapter assembly 162 supports for oscillation a ring gear 170 actuatable by the lever 18 through the cables 20 and lever 24 or 26, which oscillation rotates screw shafts 172 journalled in the gear flange 168 to axially shift a grooved control ring 174 along the shaft 114 within the reservoir 164, for selectively setting the control apparatus as will presently appear.

The control apparatus housed by and rotatable with the regulator 16, and the fluid connections between the elements thereof is shown in Fig. 4, and to some extent as shown and claimed in application S. N. 37,624, filed by R. E. Moore et al., now Patent No. 2,626,669. Providing power for the hydraulic system there are pumps 176, 180 driven by the gear flange 168 as the propeller component rotates about the adapter assembly 162, the pumps taking up fluid from the reservoir 164 and delivering fluid under pressure to a high pressure line 182. A pressure control unit 178 regulates the potential of the line 182 and determines whether the output of pump 180 will be fed into the pressure line 182 or returned directly to the reservoir 164. Pump 176 is what may be termed a system pump and operates continuously to empty into the high pressure line 182 after traversing pressure chambers of an equal area valve 184 and a pressure relief valve 186 which have lands 188, 190 respectively movable over ports emptying into a branch 192 leading to a flow control valve 194 for connecting and disconnecting the output of auxiliary pump 180 to the high pressure line 182. Both valves 184 and 186 are urged by centrifugal force and the force of associated springs to close the ports but are subject to opposing pressure in the high pressure line which is applied to the under side of lands 188, 190, to open those ports and allow the excess of pressure to flow through branch 192 to a chamber 196 of the flow control valve 194. Pressure in that chamber 196 depresses valve 194 to open exhaust ports 198, 200 returning to the reservoir. Exhaust port 198 relieves the high pressure line to the reservoir, and port 200 connects the output of the pump 180 to the reservoir. If the pressure in line 182 is lower than desired the lands 188, 190 close their respective ports and there is no exhaust through 192, wherefore, valve 194 closes the exhaust ports 198, 200 and the output of pump 180 is directed through a check valve 202 to the high pressure line 182, so as to supply a potential of pressure in the line 182 to satisfy the demands of the control apparatus. The action of the pressure control valve 178 is augmented by means of a shuttle valve 204 having actuating passages or taps 206, 208 into the pitch changing passages 150, 152 by which the blade cylinder and piston is actuated. The shuttle valve is also connected to a chamber 210 on the upper side of the valve land 188 which provides an equal area opposing the line pressure on the under side of the land 188. A selectively operable pump 212, driven by an electric motor 214 is adapted to empty into the line 182 through a check valve 216 whenever needed or desired. Though the operation of the pump 212 is under manual control, its connection to the line is effected in response to the action of a pump control valve 218 that has a chamber 220 constantly exposed to the pressure line 182, and is effective to close an exhaust port 222 only upon fall of pressure in line 182 to say less than 500 p. s. i. The output of the pump 212 is then through check valve 216. If the pressure in line 182 is above the selected value, then the output of pump 212 is through port 222 to return to the reservoir. The electrically driven pump is available for completing pitch change into the feathering band, for unfeathering, and for shifting to and from negative pitch or for accomplishing any desired pitch setting when the propeller is not rotating.

The high pressure line 182 leads to the waist 224 of the solenoid actuated valve 32, to a pressure chamber 226 of a cutoff valve 228, and to a pressure reducing valve 230, from which a reduced pressure line 232 connects with a selector valve 234 and a speed sensitive valve 236 in turn connecting back through passage 238 with the selector valve 234. The selector valve 234 determines the band of pitch settings at which the propeller component will operate, and provides for governed positive pitch as shown and indicated by the index mark G, and may be moved to F for feathering and to N for negative pitch operation. When set for governed pitch operation the lands a, b, c, and d of the valve 234 are so positioned that a branch 240 from the reduced pressure line 232 is connected through passage 242 to a servo chamber 244 of a distributor valve 246, and that the passage 238 from the speed sensitive valve 236 is connected through a passage 248 to a servo chamber 250 at the opposite end of the distributor valve 246. The servo chambers 244 and 250 of the distributor valve are of different area and are effectively opposed to one another so that movement of a valve plunger 252 of the valve may be controlled to direct fluid pressure of the system through one or the other of ports 254, 256 and passages 154, 156 to the blade shifting motor. That control of the valve is effected by the response of the speed sensitive valve 236 when the selector valve 234 is set in the illustrated or governed pitch position indicated by the letter G.

The speed sensitive valve 236 provides a body 258 slidably receiving a follow-up sleeve 260 having ports 262, 264 normally open to the fluid lines 232, 238 respectively, and slidably supported within the bore of the sleeve 260 there is a plunger 266 having a guide land 268 and a valving land 270 adapted to cover the port 264 to the passage 238. A lever 272 connects with the plunger 266 and after passing beneath a movable fulcrum 274 connects with a spring 276 attached to a bracket 278 extending from the body 258. When the propeller component is rotating centrifugal force acts upon the plunger 266 and moves it radially outward against the tension of spring 276, until an equilibrium of forces is experienced for the particular setting of the fulcrum 274. Under those conditions the land 270 will cover the port 264 and there will be no flow from 232 through 238. In consequence, there will be no movement of the distributor valve plunger 252, though reduced pressure from 232 is exerted through 240 and 242 to the servo chamber 244, because the fluid in the servo chamber 250 is trapped against drain through 248 and 238 by the register of land 270 and port 264.

With a change of speed of the propeller component there is a radial movement of the valve plunger 266 along the sleeve 260 which will operate to apply fluid pressure to the servo chamber 250 and call for an increase of blade pitch, or to permit drain from the servo chamber 250 and call for a decrease of blade pitch. The distributor valve plunger 252 provides a piston 280 bounding one side of the servo chamber 250, a pair of valving lands 282, 284 cooperating with the control ports 254, 256 and a small piston 286 bounding one side of the servo chamber 244. An extension of the rod 252 engages a cam bar 287 that operates upon an extension of the follow-up sleeve 260, such that when the distributor valve is operated it will feed back to effect the proper relation of the elements of the speed sensitive valve 236. Thus, the speed sensitive valve experiencing an increase of speed the plunger 266 moves radially outward, toward the top of the drawing, and connects reduced pressure line 232 through the port 264 through passages 238 and 248 to the servo chamber 250. Now, reduced pressure from 232 is applied to both of the servo pistons 280 and 244, but they being of different area, the pressure in the chamber 250 will predominate and the plunger 252 will move downward. Downward movement of the distributor valve relieves pressure upon the cam bar 288 with a consequent movement of the valve sleeve 260 closing the port 264. If the movement of the distributor valve plunger is enough, the control port 254 will be opened to drain and the control port 256 will be opened to whatever pressure of fluid is between the valving lands 282, 284. The valving lands 282, 284 and ports 254, 256 are so characterized that there is a positive overlap of the lands to require a minimum amount of valve plunger movement before the respective ports are open to the fluid pressure admitted between the lands 282, 284. That makes it possible for the speed sensitive valve 236 and distributor valve 246 to operate conjointly to effect a control of pitch according to the speed response curve of Fig. 2B. Under those conditions a predetermined amount of off-speed must occur before the hydraulic regulator here described will begin to control through the speed sensitive valve 236 and distributor valve 246.

The blank portions between the curve elements of Fig. 2B are termed the zero response portion, since the offspeeds thereby represented are not responded to by the speed responsive device of the hydraulic regulator, but are served by the solenoid actuated valve 32 under the control of the synchronizer device shown and described with respect to Fig. 1. Briefly, the solenoid actuated valve 32 comprises a valve plunger 288 having lands 289, 290 for control of passages 292, 294 eventually connecting with control passages 150, 152 leading to the blade shifting motor. Armatures or cores 296, 298 on the plunger 288 are immersed in solenoid windings 300, 302 grounded at 304 and connected to brushes 306, 308 engaging slip rings 310, 312 connected with the impulse lines 98, 100 from the synchronizing device of Fig. 1. The passages 292, 294 open into grooves 314, 316 of a valve plunger 318 for the cut-off valve 228 and thence by passages 320, 322 connecting with the control passages 150, 152 for the pitch shifting motor. The plunger 318 is urged by a spring 324 to a position reducing the pressure chamber 226 to a minimum volume and so as to connect passages 292, 294 with passages 320, 322 for free flow of pressure fluid when the solenoid actuated valve is directing a control force. A bleed passage 328 extending the length of the plunger 318 equalizes the pressure upon opposite ends so that the plunger will drift to the illustrated or connecting position under the urge of the spring 324. Connecting with the chamber for spring 324 there is a passage 330 having a branch and port 332 opening against and controlled by the plunger 318 while the passage 330 extends on to connect with the distributor valve at a point 334 between the valve lands 282, 284.

During on-speed conditions high pressure from the line 182 will be present at the waist 224 of the solenoid actuated valve, in the pressure chamber 226 of the cut-off valve, and by the bleed 328 and passage 330 at the waist of the distributor valve. When the solenoid actuated valve applies fluid pressure from the waist to either of the passages 292, 294 which it may do during small off-speeds, then fluid pressure will be applied to either chamber 138, 140 with a consequent movement of the blade 14. As pressure is applied to one or the other of the chambers 138, 140 the other will drain through the port 336 or 338 of the solenoid actuated valve. During greater off speeds, the distributor valve first opens one of the control ports 254, 256 to drain which permits enough relief of pressure in the opposing chamber 138, or 140 to reduce the trapped fluid in the distributor valve at 334 whose effect is felt along the passage 330 to the spring chamber 324. The pressure differential now on opposite ends of the plunger 318 permits the plunger 318 to shift to the right as shown under the urge of high pressure in the chamber 226. That movement of the plunger 318 opens the port 332 to the high pressure line 182 which now flows through 330, 334 and one of the control passages 154, 156 to the blade shifting motor. When the plunger 318 shifts to connect 182 with 332 it also isolates any action of the solenoid actuated valve from having any effect upon the blade shifting motor, since the grooves 314, 316 are moved out of alignment or connecting relation with respect to passages 292, 294, 320 and 322. The solenoid actuated valve may still operate upon call of the synchronizer device but its operation will have no effect upon the control of the blade shifting motor until the off-speed reduces to the point where the hydraulic regulator will not correct for it.

Off-speeds of the greater magnitude may occur when the manual control 22 or 24 are moved so as to set a new speed level within the governed positive pitch band at which the propeller component is to be operated, as well as in shifting from one band to another as from governed pitch to feathering, to negative or in shifting to return to the governed pitch band. Interband shifting is accomplished by movement of the pilot's control lever 22 for each independent propeller component, or by the master lever 24 for all of the components as a group. Movement of the master lever 24 also adjusts the reference speed source 30, and the levers and linkage is so constituted that the same speed level is selected or set up for both of the control devices, while the selector valve 234 is in the governed positive pitch band indicated by G. Any movement of the levers 22 operates through cables 29 to oscillate the lever 18 of the hydraulic regulator 16 for the corresponding propeller component. Oscillation of lever 18 rotates the ring gear 170 that rotates the screw shafts 172 and moves the control ring 174 along the shaft 114. Any movement of the control ring 174 shifts actuators 340, 342 for the fulcrum 274 of the speed sensitive valve 236, and for the selector valve 234 respectively. While Fig. 3 shows there to be separate actuators 340, 342 following the groove of the control ring, Fig. 4 illustrates those actuators as joined and movable as a single element. The actuator 342 is shown as having a cam slot 344 made up of a horizontal portion and two inclined end portions engaging a pin 346 of the valve plunger. In any event movement of the actuators 340, 342 to the left of Fig. 4 shifts the fulcrum 274 along the lever 272 to a point beneath the spring 276, and also moves the selector valve upward to index at F for feathering. Movement of the actuators 340, 342 to the right shifts the fulcrum 274 to a point near the plunger 266, and also moves the selector valve downward to index at N for negative pitch. When feathering is selected, the valve plunger 266 moves outward to connect 232 with 238 which is now cut off by land b of the selector valve in its F position. Land d cuts off 240, but the lower branch of 242 opening from the selector valve is now open to drain and the lower branch of 248 is in direct connection with low pressure from 232, which effects downward movement of the distributor valve 252. There now being reduced pressure in servo chamber 250, with servo chamber 244 open to drain, there is nothing to stop movement of the valve 252 until the port 256 is wide open, a condition that seldom if ever occurs in governed pitch control. When negative pitch is selected, the valve plunger 266 moves inward to open the port 264 and passage 238 to drain, but drain through 238 is now cut off by land a of the selector valve in its N position. Branch 248 from 232 is also cut off by land c which also uncovers the upper branch from 242 and connects it with the reduced pressure from 232 applied through the waist of the selector valve. Hence, reduced pressure as applied to the servo chamber 250 is open to drain so that the distributor valve 252 moves upward to fully uncover port 254 leading to the decrease pitch chamber 138 of the blade shifting motor. As the blade reaches its negative pitch position it actuates a rod or shaft 348 to move a wedge or the like 350 beneath the valve plunger 266, which wedge mechanically shifts the valve outward along the follow up sleeve 268 to a point where the reduced pressure line 232 and passage 238 are connected preparatory for return shift to the positive governed pitch band. In both feathering and negative pitch operation the distributor valve is operated by fluid pressure from the line without the assistance of the speed sensitive valve 236. The selector valve in its shifted position connects the reduced pressure line directly with one of the servo chambers, and cancels out any effect of the speed sensitive valve. Whenever either of the control ports 254, 256 are opened for an interband shift the pressure differentials on opposite ends of the cut-off valve plunger 318 are such that the plunger immediately moves to the right, due to the higher pressure in chamber 226, blocking off the passages 292, 294 from the solenoid actuated valve 32, and connects port 332 and passage 330 with the high pressure line 182. Thus, which ever port 254, 256 is wide open to port 334 is directly connected with high pressure from line 182 and the blade piston 136 is quickly and forcefully actuated to effect the desired interband shift. It should appear from the foregoing that any propeller control effected by the hydraulic regulator is not interferred with by the solenoid actuated valve but in its action interrupts the action of that valve. In other words, both valves, that is, the solenoid actuated valve and the distributor valve cannot control at the same time. One controls for small off-speeds within a predetermined range, and the other controls for greater off-speeds outside the predetermined range. Together, the two valves supplement one another to give complete and continuous control for the entire range of blade shift movement, and consequently complete control of the engine-propeller combinations for all conditions of operation.

One specific form of the solenoid actuated valve for effecting the intraband control is shown in Fig. 5 of the drawings, where a block 352 is provided with a longitudinal bore flaring outward at each end by steps 354, 356 to make way for actuating structure. The smallest and central part of the bore is undercut at 358, 360 and 362 to provide fluid channels which open by passages 364, 366 and 368 to one surface of the body 352 which is adapted to be mounted on a pad of the regulator member suitable for making tight fluid connection with the passages 292, 182 and 294 respectively, seal rings 370 being provided. Within that same part of the bore there is placed a porting sleeve 372 that has ports 374, 376, and 378 opening from the bore of the sleeve to the channels 358, 360 and 362. In the middle diameter bore 354 at each end of the body there is disposed the actuating windings 300, 302 that surround field structure 380 seated in the largest diameter 356. A flanged ring 382 holds the windings and field structures in place and supports a diaphragm spring 384 to which the ends of the valve plunger 288 is secured by screws 386. Cap screws 388 extend through a cap 390 and the flanged ring 382 to compress gaskets 392, 394 and thread into the block 352. The plunger 288 supports the armatures 296, 298 which provide a conic face at the airgap next to the field structure 380. At the center of the plunger is fixed a sleeve 396 providing the valve lands 289, 290 normally covering the ports 374, 378 by reason of the centering influence of the diaphragm springs 384. The wires 398, 400 communicate with the windings 300, 302 and extend to the brushes 306, 308 controlled by the synchronizer device. Any impulse sent over the wires 98, 100 are applied through 398, 400 to one or the other of the windings 300, 302 to magnetize one of the cores 380. The corresponding armature 296, 298 is actuated which flexes the diaphragm spring 384 and moves the valve sleeve 396. If the valve sleeve 396 is moved to the left, then ports 374, 376 are connected and high pressure fluid admitted through 366 traverses port 376, 374, 358 and 364 to 292 on its way to the blade shifting motor, drain back from which returns through 294 and 338 to the reservoir.

While the embodiment of the present invention as herein disclosed, constitutes a preferred form, it is to be understood that other forms might be adopted.

What is claimed is as follows:

1. A system for governing an engine-propeller combination of a multiplacement installation wherein each engine-propeller combination is to be operated at the same reference speed including, an adjustable reference speed source, fine control means outside of the engine-propeller combination but connected with each propeller component for comparing the current speed of each engine-propeller combination with the reference speed and including means for translating an off-speed error of any combination to a corrective impulse for an erring engine-propeller combination, coarse control means within the propeller component of each engine-propeller combination for controlling that combination to approximate the said reference speed, said coarse control means including speed sensitive mechanism having a distributor valve with a pair of control ports, a reversible blade shifting motor having control passages connected with each of said control ports, a reciprocable double acting valve having control ports with branches connected respectively to said control passages, a source of fluid pressure within the said propeller component and connected with said distributor valve and said reciprocable valve, and means applying the corrective impulses of said fine control means for operation of said reciprocable valve for effecting fine adjustment of said reversible blade shifting motor, said speed sensitive mechanism responding to off-speeds greater than a predetermined off-speed for applying a coarse adjustment to the reversible blade shifting motor, and said reciprocable valve being actuated by the corrective impulses applied by said fine control means responding to off-speeds less than said predetermined off-speed for applying a fine adjustment to the reversible blade shifting motor, and a blocking valve exposed to the source of fluid pressure and connected in the branches between said reciprocable valve control ports and said motor, said blocking valve being constructed and arranged to close the branches from the control ports of the reciprocable valve whenever the speed sensitive mechanism is applying an adjustment to the blade shifting motor.

2. In a system of blade pitch control for each of a plurality of engine-propeller combinations to be operated at a selected reference speed, the combination comprising, adjustable reference speed source, means for comparing the current speed of each engine-propeller combination with the reference speed source and for sensing the amount and character of any speed error, means translating the speed error sensed into a corrective electrical impulse to be applied to the propeller component of an erring engine-propeller combination, said propeller component including a reversely operable solenoid actuated control valve having pressure supply and control ports and responsive to the corrective impulses applied by the translating means, a source of fluid pressure within the propeller component having a connection to the solenoid actuated valve, a pitch shifting motor and passages connecting said motor to the control ports of said solenoid actuated valve for distributing fluid pressure to the pitch shifting motor in accordance with the speed error experienced by the engine propeller combination, a fluid control having a line connected to and powered by said source of fluid pressure, said fluid control being responsive to propeller speed variations greater than a given off-speed for supplementing the solenoid actuated valve in distributing fluid pressure to the pitch shifting motor, and a pressure differential sensitive valve in the pressure source line connected to the fluid control, said pressure differential sensitive valve being located between said pitch shifting motor and said solenoid actuated valve control ports and operable to disconnect the control ports of the solenoid actuated valve from the pitch shifting motor when the fluid control is responding to the greater off-speeds.

3. In a system of blade pitch control for each of a plurality of engine-propeller combinations to be operated at a selected reference speed, the combination comprising, an adjustable reference speed source, means for comparing the current speed of each engine-propeller combination with the reference speed source and for sensing the amount and character of any speed error, means translating the speed error sensed into a corrective electrical impulse to be applied to the propeller component of an erring engine-propeller combination, each propeller component embodying a self energized fluid system for controlling the speed thereof to approximate the particular adjusted reference speed and including a pitch shifting motor, a distributor valve for directing fluid under pressure from the system to the pitch shifting motor, a speed sensitive valve responding to deviations of propeller speed from the adjusted reference speed for actuating said distributor valve when the speed deviation is relatively large and more than a predetermined value, and a solenoid actuated valve responding to the corrective electrical impulse applied by the translating means for directing fluid under pressure from the system to the pitch shifting motor, whereby blade pitch shift is made by the solenoid actuated valve for lesser deviations of propeller speed from the adjusted reference speed and means responding to action of the distributor valve in directing fluid pressure to the pitch shifting motor for interrupting the fluid connection between the solenoid actuated valve and the pitch shifting motor.

4. Speed control means for a plurality of engine-propeller combinations to be operated at a selected reference speed including, an adjustable reference speed source, a fluid control system for each propeller component for effecting propeller operation in either the feathered pitch range, the governed pitch range, or the negative pitch range, manually operated means for selecting the pitch range within which the propeller is to operate, and for selecting the approximate speed level within the governed pitch range to which propeller will be controlled, a blade pitch changing motor, said fluid control system having a speed sensitive valve and a distributor valve, means controlled by movements of said speed sensitive valve when the propeller is operating within the governed pitch range for actuating said distributor valve to enable it to direct fluid pressure to the pitch changing motor in response to propeller off-speeds greater than a predetermined differential from the adjusted reference speed source, a solenoid actuated valve operable to direct fluid pressure to the pitch changing motor in response to propeller off-speeds within the predetermined differential from the adjusted reference speed source, a synchronizing device for comparing the current speeds of the engine-propeller combinations with the adjusted reference speed source, and for applying a corrective electrical impulse to the solenoid actuated valve of the erring engine-propeller combination, means for supplying the system with fluid under pressure, to be applied to the pitch changing motor by either the distributor valve or the solenoid actuated valve, and means responding to action of the distributor valve in directing fluid pressure to the pitch shifting motor for interrupting the fluid connection between the solenoid actuated valve and the pitch shifting motor when the manually operated means is actuated to select propeller operation in the feathered pitch range or negative pitch range.

5. In a system of control for an engine propeller combination of a multiplacement installation wherein each engine propeller combination is to be operated at a reference speed, a source of adjustable reference speed, control means outside of the engine propeller combination but connected with each propeller component for comparing the current speed of each engine propeller combination with the reference speed source and for translating a speed error into a corrective impulse for the respective engine propeller combination, control means within the propeller component of each engine propeller combination for governing that combination to constant speed operation comparable with a selected speed of said reference speed source, manually operated means connected with both the outside and inside control means for setting the reference speed and for selecting a comparable governed constant speed, the governing control means within the propeller component including a blade actuating motor for shifting the blade in pitch angle, a source of power created by rotation of the propeller component, power distributing means responding to an off-speed of large magnitude for connecting the source of power to the blade actuating motor to effect coarse adjustment of the blade pitch angle, a second power distributing means responding to an off-speed of small magnitude and controlled by the corrective impulse from the control means outside of the combination for connecting said source of power to the blade actuating motor to effect fine adjustment of the blade pitch angle, and means within the propeller component exposed to said source of power and located between said second power distributing means and said motor for blocking the connection of said source of power with said blade actuating motor under the control of said second power distributing means whenever the source of power is being connected to the blade actuating motor by the first mentioned power distributing means for coarse adjustment of the blade pitch angle.

6. In a system of control for an engine propeller combination of a multiplacement installation wherein each engine propeller combination is to be operated at a reference speed, a source of adjustable reference speed, control means outside of the engine propeller combination but connected with each propeller component for comparing the current speed of each engine propeller combination with the reference speed source and for translating a speed error into a corrective impulse for the respective engine propeller combination, coarse control means within the propeller component of each engine propeller combination for controlling that combination to approximate the speed of said reference speed source, said coarse control means including a reversible fluid operated motor for shifting a blade in pitch angle, a source of fluid pressure for said motor, a speed sensitive mechanism for connecting the source of fluid pressure to either side of said reversible motor in response to off-speeds of the combination greater than a predetermined off-speed from said reference speed source, a fine control means within said propeller component including a controllable valve responding to said corrective impulse translated by the control means outside of the engine propeller combination for connecting the source of fluid pressure to either side of said reversible motor in response to off-speeds of the combination less than the predetermined off-speed from said reference speed source, and a fluid blocking valve located between said controllable valve and said motor for interrupting the connection of said controllable valve with said reversible motor upon control by the coarse control means whenever the coarse control means is controlling to approximate constant speed.

7. In a system for governing an engine propeller combination of a multiplacement installation wherein such engine propeller combination is to be operated at the same reference speed, an adjustable reference speed source, fine control means outside of the engine propeller combination but connected with each propeller component for comparing the current speed of each engine propeller combination with said reference speed source and including means for translating a speed error of any combination into a corrective impulse for the erring engine propeller combination, coarse control means within the propeller component of each engine propeller combination for controlling that combination to approximate the speed of said reference speed source, said coarse control means including a speed sensitive mechanism having a speed sensitive valve and a distributing valve with a pair of control ports, a reversible blade shifting motor having control passages connected with each of said control ports, a reciprocable double-acting valve having control ports with branches connected respectively to said control passages, a source of fluid pressure within said propeller component and connected with said distributor valve, said speed sensitive valve and said reciprocable valve, a blocking valve inserted in the branch connections between the reciprocable valve and the control passages, said blocking valve being exposed to the source of fluid pressure connected to said reciprocable valve, means applying the corrective impulses of said fine control means for operation of said reciprocable valve to effect fine adjustment of said reversible blade shifting motor, and means for moving said distributor valve in opposite directions, said speed sensitive valve responding to off-speeds greater than a predetermined off-speed for actuating said means for moving the distributor valve so as to condition the distributor valve for applying a coarse adjustment to said reversible blade shifting motor, said reciprocable valve being actuated by the corrective impulses applied by said fine control means responding to off-speeds less than said predetermined off-speed for applying a fine adjustment to the reversible blade shifting motor, and said blocking valve reacting to control by said distributor valve for interrupting the branch connections between the reciprocable valve and the control passages to the blade shifting motor.

8. In a system of blade pitch control for each of a plurality of engine propeller combinations to be operated at a selected reference speed, the combination comprising: an adjustable reference speed source, means for comparing the current speed of each engine propeller combination with said reference speed source and for sensing the amount and character of any speed error, means for translating the speed error sensed into a corrective electrical impulse to be applied to the propeller component of an erring engine propeller combination, said propeller component including a reversely operable solenoid actuated control valve having pressure and control ports, said solenoid actuated valve being responsive to the corrective impulse applied by said translating means, a source of fluid pressure within the propeller component having a connection to said solenoid actuated valve, a pitch shifting motor and passages connecting said motor to the control ports of said solenoid actuated valve for distributing fluid pressure to the pitch shifting motor in accordance with the speed error experienced by the engine propeller combination, a blocking valve for the solenoid actuated valve having through connections inserted in the passages from said motor to the control ports of said solenoid actuated valve, and having an area exposed to the source of fluid pressure, a control powered by said source of fluid pressure and responsive to propeller speed variations greater than a given off-speed for supplementing said solenoid actuated valve in distributing fluid pressure to said pitch shifting motor, and means responding to said control for actuating said blocking valve for interrupting the through passages of said solenoid actuated valve to said pitch shifting motor.

9. Speed control means for a plurality of engine propeller combinations to be operated at a selected reference speed including, an adjustable reference speed source, a fluid control system for each propeller component for effecting propeller operation in either the feathered pitch range, the governed pitch range or the negative pitch range, means for selecting the pitch range within which the propeller is to operate, and for simultaneously selecting the approximate speed level within the governed pitch range at which the propeller is to be controlled, a blade pitch changing motor, said fluid control system including a speed sensitive valve and a distributor valve, means controlled by the position of said speed sensitive valve for moving said distributor valve in opposite directions, said distributor valve having passages connecting it to the pitch changing motor for directing fluid pressure to the pitch changing motor when said speed sensitive valve moves said distributor valve in response to propeller off-speed greater than a predetermined differential from said adjusted reference speed source, a solenoid actuated valve having passages connecting it to the pitch changing motor and operable to direct fluid pressure to said pitch changing motor in response to propeller off-speeds within the predetermined differential from said adjusted reference speed source, means responding to operation of said distributor valve in directing fluid pressure to said pitch shifting motor for interrupting the fluid connection between said solenoid actuated valve and the pitch shifting motor, a synchronizing device for comparing the current speed of the engine propeller combinations with said adjusted reference speed source, and for applying a corrective electrical impulse to the solenoid actuated valve of an erring engine propeller combination, and means for supplying the system with fluid under pressure, to be applied to said pitch changing motor by either the distributor valve or the solenoid actuated valve.

10. The combination set forth in claim 9, wherein the interrupting means includes a blocking valve provided between the solenoid actuated valve and the pitch changing motor for blocking the action of the solenoid actuated valve, and means for actuating said blocking valve when the distributor valve is directing fluid pressure to the pitch changing motor.

11. The combination set forth in claim 9, wherein the interrupting means includes a valve means exposed to the fluid pressure source of the system for blocking the action of the solenoid actuated valve, and fluid pressure means for actuating said valve means whenever the distributor valve is directing fluid pressure to the pitch changing motor, and whenever the propeller is operating in either the feathered pitch range or the negative pitch range.

12. The combination set forth in claim 9, wherein the interrupting means includes a valve unit spring urged to complete the fluid connection between the solenoid actuated valve and the pitch changing motor, said valve unit being located between said fluid pressure source and said distributor valve, said valve unit being constructed and arranged to normally block the fluid pressure source to the distributor valve, but displaceable upon predetermined actuation of the distributor valve to open the pressure source connection to the distributor valve, and to close the connection between the solenoid actuated valve and the pitch changing motor whereby the pitch changing motor can be controlled by either the distributor valve or the solenoid actuated valve but not by both at the same time.

References Cited in the file of this patent

UNITED STATES PATENTS

| Number | Name | Date |
|---|---|---|
| 1,972,486 | Hoover | Sept. 4, 1934 |
| 2,321,267 | Van Der Werff | June 8, 1943 |
| 2,363,670 | Hoover | Nov. 28, 1944 |
| 2,375,255 | Snader et al. | May 8, 1945 |
| 2,391,699 | Haines et al. | Dec. 25, 1945 |
| 2,410,659 | Hoover | Nov. 5, 1946 |
| 2,423,400 | Nichols | July 1, 1947 |
| 2,424,559 | Drake | July 29, 1947 |
| 2,501,228 | Light | Mar. 21, 1950 |
| 2,517,703 | Offner | Aug. 8, 1950 |
| 2,557,679 | Nichols | June 19, 1951 |
| 2,557,991 | Nichols | June 26, 1951 |